(12) United States Patent
Kitano et al.

(10) Patent No.: US 9,631,596 B2
(45) Date of Patent: Apr. 25, 2017

(54) ENGINE STARTING DEVICE AND ENGINE STARTING METHOD

(71) Applicants: Hiroaki Kitano, Chiyoda-ku (JP);
Daisuke Mizuno, Chiyoda-ku (JP);
Osamu Ishikawa, Chiyoda-ku (JP);
Takeru Okabe, Chiyoda-ku (JP);
Koichiro Kamei, Chiyoda-ku (JP)

(72) Inventors: Hiroaki Kitano, Chiyoda-ku (JP);
Daisuke Mizuno, Chiyoda-ku (JP);
Osamu Ishikawa, Chiyoda-ku (JP);
Takeru Okabe, Chiyoda-ku (JP);
Koichiro Kamei, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 14/396,819

(22) PCT Filed: Mar. 19, 2013

(86) PCT No.: PCT/JP2013/057785
§ 371 (c)(1),
(2) Date: Oct. 24, 2014

(87) PCT Pub. No.: WO2013/187101
PCT Pub. Date: Dec. 19, 2013

(65) Prior Publication Data
US 2015/0096535 A1    Apr. 9, 2015

(30) Foreign Application Priority Data

Jun. 14, 2012 (JP) ................................. 2012-134851

(51) Int. Cl.
*F02N 11/00* (2006.01)
*F02N 11/08* (2006.01)
(Continued)

(52) U.S. Cl.
CPC ...... *F02N 11/0818* (2013.01); *F02D 41/0097* (2013.01); *F02D 41/065* (2013.01);
(Continued)

(58) Field of Classification Search
CPC ............. F02N 11/0844; F02N 11/0855; F02N 11/0818; F02N 11/0851; F02N 2200/022;
(Continued)

(56) References Cited

U.S. PATENT DOCUMENTS 7,681,545 B2 * 3/2010 Taki ..................... F02N 11/0844
123/179.3
8,671,903 B2 * 3/2014 Notani ................. F02N 11/0855
123/179.4
(Continued)

FOREIGN PATENT DOCUMENTS

| JP | 2003-65191 A | 3/2003 |
|---|---|---|
| JP | 2009-115009 A | 5/2009 |

(Continued)

OTHER PUBLICATIONS

International Search Report of PCT/JP2013/057785, dated Apr. 16, 2013. [PCT/ISA/210] English Translation.
(Continued)

*Primary Examiner* — Hai Huynh
*Assistant Examiner* — Gonzalo Laguarda
(74) *Attorney, Agent, or Firm* — Sughrue Mion, PLLC; Richard C. Turner

(57) ABSTRACT

The engine starting device for stopping, when an engine automatic stop condition is satisfied, fuel injection to the engine to automatically stop the engine, and for thereafter restarting the engine when an engine restart condition is satisfied, includes: a ring gear coupled to a crankshaft of the engine; a starter motor rotated by a current supply; a pinion gear for transmitting the rotation of the starter motor to the ring gear; a pinion gear moving part for moving the pinion gear toward the ring gear by a current supply, thereby
(Continued)

meshing the pinion gear with the ring gear; and a fuel injection control part for restarting the fuel injection so that combustion is generated in a predetermined compression cylinder after the engine restart condition is satisfied and after the pinion gear moving part starts the movement of the pinion gear.

21 Claims, 10 Drawing Sheets

(51) Int. Cl.
| | | |
|---|---|---|
| *F02D 41/00* | (2006.01) | |
| *F02D 41/06* | (2006.01) | |
| *F02N 15/06* | (2006.01) | |
| *F02P 5/15* | (2006.01) | |
| *F02P 5/155* | (2006.01) | |
| *F02N 19/00* | (2010.01) | |

(52) U.S. Cl.
CPC ...... *F02N 11/0844* (2013.01); *F02N 11/0851* (2013.01); *F02N 15/067* (2013.01); *F02P 5/1506* (2013.01); *F02P 5/1558* (2013.01); F02D 2041/0092 (2013.01); F02D 2200/101 (2013.01); F02N 11/0855 (2013.01); F02N 2019/002 (2013.01); F02N 2200/022 (2013.01); F02N 2300/2002 (2013.01); Y02T 10/46 (2013.01); Y02T 10/48 (2013.01)

(58) Field of Classification Search
CPC .... F02N 15/067; Y02T 10/48; F02D 41/0097; F02D 41/065; F02P 5/1506; F02P 5/1558
See application file for complete search history.

(56) References Cited

U.S. PATENT DOCUMENTS

| | | | |
|---|---|---|---|
| 2002/0017260 A1* | 2/2002 | Saito | F02N 11/0851 |
| | | | 123/179.3 |
| 2009/0118991 A1 | 5/2009 | Ueda | |
| 2009/0224557 A1* | 9/2009 | Reynolds | F02N 11/0814 |
| | | | 290/38 R |
| 2010/0050970 A1* | 3/2010 | Okumoto | F02N 11/0844 |
| | | | 123/179.4 |
| 2010/0059007 A1* | 3/2010 | Senda | F02N 11/0844 |
| | | | 123/179.4 |
| 2011/0137544 A1 | 6/2011 | Kawazu et al. | |
| 2011/0202254 A1 | 8/2011 | Ishikawa et al. | |
| 2011/0239821 A1 | 10/2011 | Ogawa et al. | |
| 2012/0109502 A1 | 5/2012 | Ishikawa et al. | |

FOREIGN PATENT DOCUMENTS

| | | |
|---|---|---|
| JP | 2011-140938 A | 7/2011 |
| JP | 2011-169225 A | 9/2011 |
| JP | 2011-169228 A | 9/2011 |

OTHER PUBLICATIONS

Communication dated Apr. 26, 2016, issued by the State Intellectual Property Office of the P.R.C. in corresponding Chinese Application No. 201380031149.X.

* cited by examiner

ENGINE STARTING DEVICE AND ENGINE STARTING METHOD

CROSS REFERENCE TO RELATED APPLICATIONS

This application is a National Stage of International Application No. PCT/JP2013/057785 filed Mar. 19, 2013, claiming priority based on Japanese Patent Application No. 2012-134851, filed Jun. 14, 2012, the contents of all of which are incorporated herein by reference in their entirety.

TECHNICAL FIELD

The present invention relates to an engine starting device and an engine starting method for use in an engine automatic stop/restart system configured to stop, when a predetermined engine automatic stop condition is satisfied, fuel injection to an engine to automatically stop the engine, and to thereafter restart the engine when an engine restart condition is satisfied.

BACKGROUND ART

Hitherto, an engine automatic stop/restart system has been developed for automatically stopping an engine when predetermined conditions are satisfied for the purpose of improvement of the vehicle fuel consumption, reduction in an environment load, and the like. However, it takes time for the engine rotation to be completely stopped by a friction force, and hence there is such a problem that the related-art engine automatic stop/restart system cannot carry out the restart of the engine during this period.

Then, in order to solve the problem, there has been proposed an engine start control device for engaging a rotational drive mechanism with an engine, thereby rotationally driving the engine when it is determined that an engine rotation speed has decreased to a rotation speed allowing the rotational drive mechanism to engage with the engine (for example, refer to Patent Literature 1).

Moreover, there has been proposed an engine automatic stop/start control device for estimating a trajectory of a drop in an engine rotation speed when an engine is to be automatically stopped, and determining, based on estimated data for the engine rotation drop trajectory, a timing of pushing out a pinion gear of a starter to mesh the pinion gear with a ring gear coupled to a crankshaft of the engine (for example, refer to Patent Literature 2).

Moreover, there has been proposed an engine automatic stop/restart device configured as follows. In a case where an engine stop condition is satisfied to stop fuel injection to an engine and thereafter an engine restart condition is satisfied before the engine is stopped, when it is determined that a self-recovery of restarting the engine only by restart of the fuel injection is possible, the fuel injection to the engine is restarted for the self-recovery of the engine. When it is determined that the self-recovery of the engine is not possible, the fuel injection to the engine is restarted, and based on an engine rotation speed and a pinion gear rotation speed, operations of pinion gear drive means for axially moving a pinion gear to mesh the pinion gear with a ring gear and a starter motor for rotationally driving the pinion gear are controlled (for example, refer to Patent Literature 3).

CITATION LIST

Patent Literature

[PTL 1] JP 2003-65191 A
[PTL 2] JP 2011-140938 A
[PTL 3] JP 2011-169225 A

SUMMARY OF INVENTION

Technical Problem

However, the related technology has the following problem.

Patent Literature 1 describes that the starter is driven before the engine stops, and the fuel injection to the engine is restarted synchronously therewith, but does not describe a restart timing of the starter drive and the fuel injection.

Moreover, Patent Literature 2 describes that the engine rotation drop trajectory is estimated based on an energy change, and the engine is restarted through the engagement of the pinion gear of the starter with the ring gear based on the engine rotation drop trajectory, but does not describe a restart timing of the fuel injection.

Moreover, Patent Literature 3 describes that the fuel injection to the engine is restarted simultaneously when the engine restart condition is satisfied, and the operations of the pinion gear drive means and the starter motor are controlled if the engine cannot be self-recovered simply by the restart of the fuel injection, but does not describe a restart timing of the fuel injection for rotating the starter motor after the movement of the pinion gear is started.

In other words, the restart timing of the fuel injection after the engine restart condition is satisfied and after the movement of the pinion gear is started is not described in Patent Literatures 1 to 3, and hence there is such a problem that it takes a long time until the engine restarts the combustion, and noise is generated due to a failure of meshing of the gears.

The present invention has been made in view of the above-mentioned problem, and therefore has an object to provide an engine starting device and an engine starting method for enabling a quick and quiet restart of an engine during an inertial rotation thereof.

Solution to Problem

According to one embodiment of the present invention, there is provided an engine starting device for stopping, when an engine automatic stop condition is satisfied, fuel injection to an engine to automatically stop the engine, and for thereafter restarting the engine when an engine restart condition is satisfied, the engine starting device including: a ring gear coupled to a crankshaft of the engine; a starter motor rotated by a current supply; a pinion gear for transmitting the rotation of the starter motor to the ring gear; a pinion gear moving part for moving the pinion gear toward the ring gear by a current supply, thereby meshing the pinion gear with the ring gear; and a fuel injection control part for restarting the fuel injection so that combustion is generated in a predetermined compression cylinder after the engine restart condition is satisfied and after the pinion gear moving part starts the movement of the pinion gear.

Further, according to another embodiment of the present invention, there is provided an engine starting method carried out by an engine starting device for stopping, when an engine automatic stop condition is satisfied, fuel injection to an engine to automatically stop the engine, and for thereafter restarting the engine when an engine restart condition is satisfied, the engine starting device including: a ring gear coupled to a crankshaft of the engine; a starter motor rotated by a current supply; a pinion gear for transmitting the rotation of the starter motor to the ring gear; and a pinion gear moving part for moving the pinion gear toward the ring gear by a current supply, thereby meshing the pinion gear with the ring gear, the engine starting method including a fuel injection control step of restarting the fuel injection so that combustion is generated in a predetermined compression cylinder after the engine restart condition is satisfied and after the pinion gear moving part starts the movement of the pinion gear.

Advantageous Effects of Invention

According to the engine starting device and the engine starting method of one embodiment of the present invention, the fuel injection control part (fuel injection control step) restarts the fuel injection so that the combustion is generated in the predetermined compression cylinder after the engine restart condition is satisfied and after the pinion gear moving part starts the movement of the pinion gear.

Therefore, the engine starting device and the engine starting method can be provided, which can reduce the period until the engine restarts the combustion, and can quickly and quietly restart the engine during the inertial rotation thereof.

DESCRIPTION OF EMBODIMENTS

Figure 1:
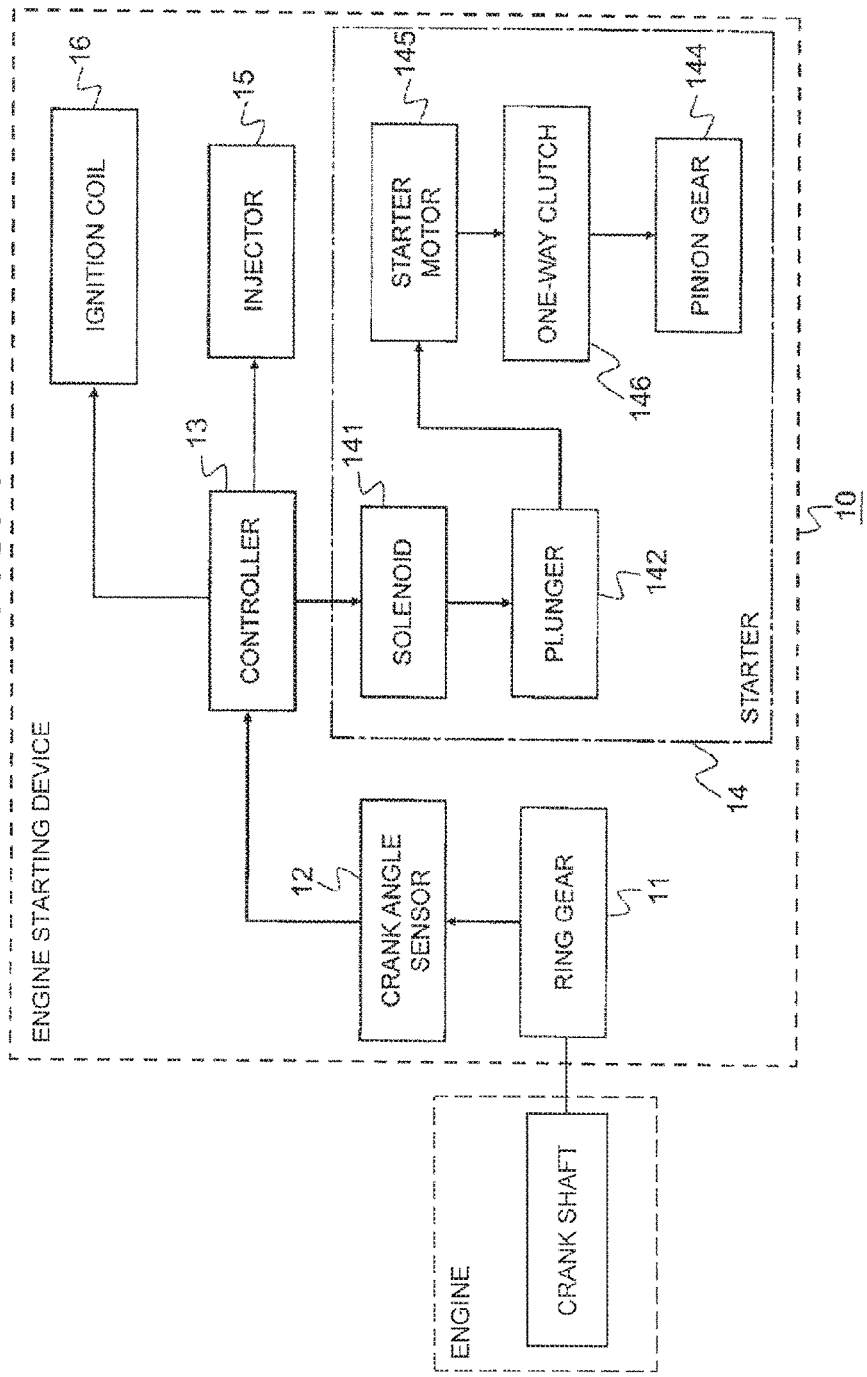
FIG. 1 is a block configuration diagram illustrating a schematic configuration of an engine starting device according to a first embodiment of the present invention.

In the following, engine starting devices according to exemplary embodiments of the present invention are described referring to the accompanying drawings. In the drawings, the same or corresponding parts are denoted by the same reference symbols for description. Note that, a description is given of the embodiments while a port-injection three-cylinder engine is exemplified.

First Embodiment

FIG. 1 is a block configuration diagram illustrating a schematic configuration of an engine starting device according to a first embodiment of the present invention. Moreover, FIG. 2 is a partial cutaway front view of a starter of the engine starting device according to the first embodiment of the present invention.

Figure 2:
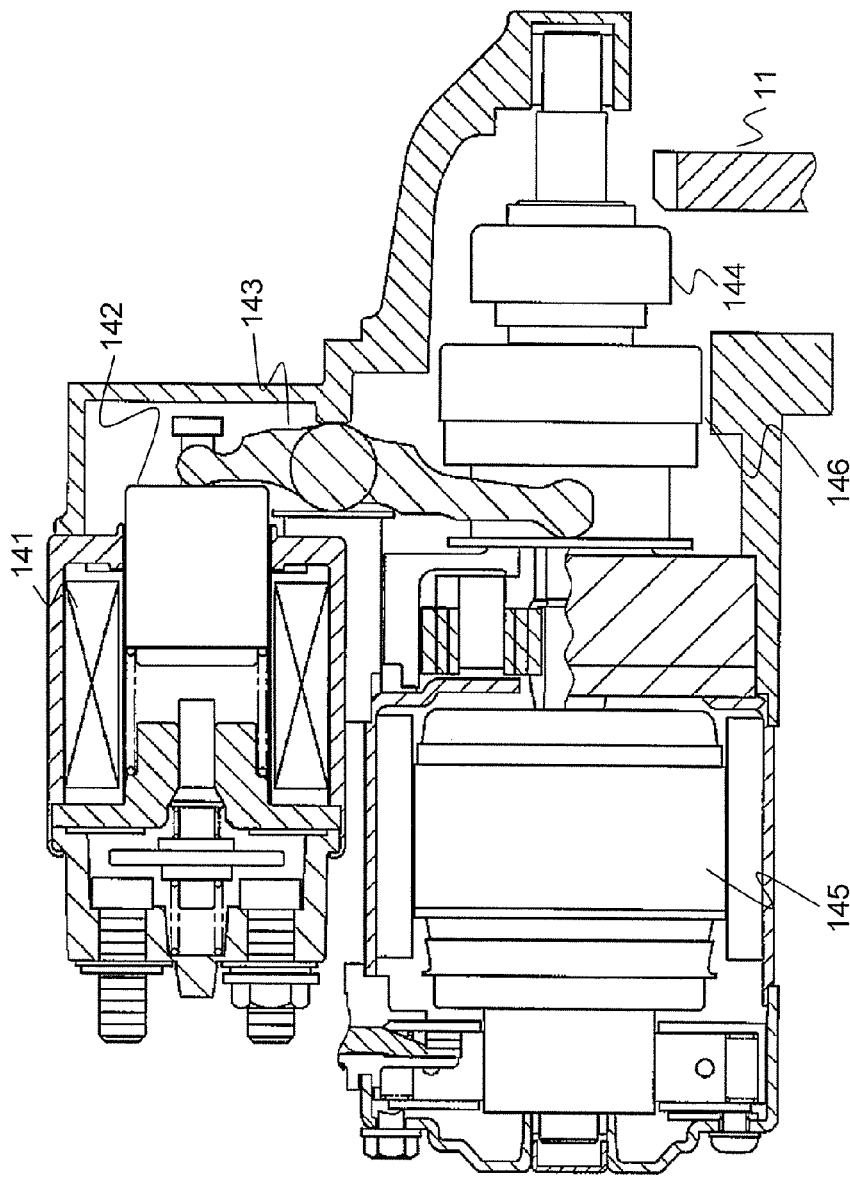
FIG. 2 is a partial cutaway front view of a starter of the engine starting device according to the first embodiment of the present invention.

In FIGS. 1 and 2, an engine starting device 10 includes a ring gear 11, a crank angle sensor 12, a controller 13, a starter 14, an injector 15, and an ignition coil 16. Moreover, the starter 14 includes a solenoid 141, a plunger 142, a lever 143, a pinion gear 144, a starter motor 145, and a one-way clutch 146.

The ring gear 11 is coupled to a crankshaft of the engine, and meshes with the pinion gear 144, thereby transmitting a driving force to the engine. The crank angle sensor 12 detects a crank angle of the engine for determining a fuel injection timing and an ignition timing, and outputs a signal corresponding to a detected value thereof to the controller 13.

The controller 13 is constructed by an engine ECU (not shown), for example, and controls a current supply to the solenoid 141 of the starter 14, the fuel injection by the injector 15 to each of the cylinders, and an ignition by the current supply to the ignition coil 16 based on the signal from the crank angle sensor 12 and the like.

The plunger 142 is attracted by the current supply to the solenoid 141, and the pinion gear 144 is moved via the lever 143 so that the pinion gear 144 is meshed with the ring gear 11. Moreover, a contact is closed by the movement of the plunger 142 to supply a current to the starter motor 145, and the pinion gear 144 is rotated so that the driving force is transmitted to the engine while the ring gear 11 is meshed with the pinion gear 144. Moreover, the one-way clutch 146 coupled to an output shaft of the starter motor 145 idles if a torque is input from the ring gear 11.

Moreover, the controller 13 calculates the crank angle based on the signal from the crank angle sensor 12 and the like, and carries out the fuel injection by using the injector 15 depending on the crank angle. Further, the controller 13 carries out a voltage charge to the ignition coil 16 depending on the calculated crank angle, and generates a spark by an ignition plug (not shown), thereby igniting a fuel.

Moreover, the controller 13 calculates an engine rotation speed NE based on a cycle of a rotational pulse of the crankshaft output from the crank angle sensor 12. Note that, in place of calculating the engine rotation speed NE by the controller 13, a rotary encoder or a pulse generator capable of detecting pulses based on teeth of the ring gear 11 may be provided, and the engine rotation speed NE may be calculated by means of frequency-voltage (FV) conversion of the signal therefrom.

Moreover, the rotation speed of the starter motor 145 may be reduced by a tooth ratio between the pinion gear 144 and the ring gear 11 or a planetary gear (not shown), but is assumed to always be a value converted in terms of the crankshaft of the engine for the sake of convenience. Moreover, the rotation speed is used in the first embodiment, but control based on a peripheral speed may be carried out by using a gear radius.

On this occasion, when an engine automatic stop condition (such a condition that the vehicle speed is equal to or less than 15 km/h and a driver is applying a brake) is satisfied while a vehicle travels, the controller 13 stops the fuel injection to the engine, thereby inertially rotating the engine.

Figure 3:
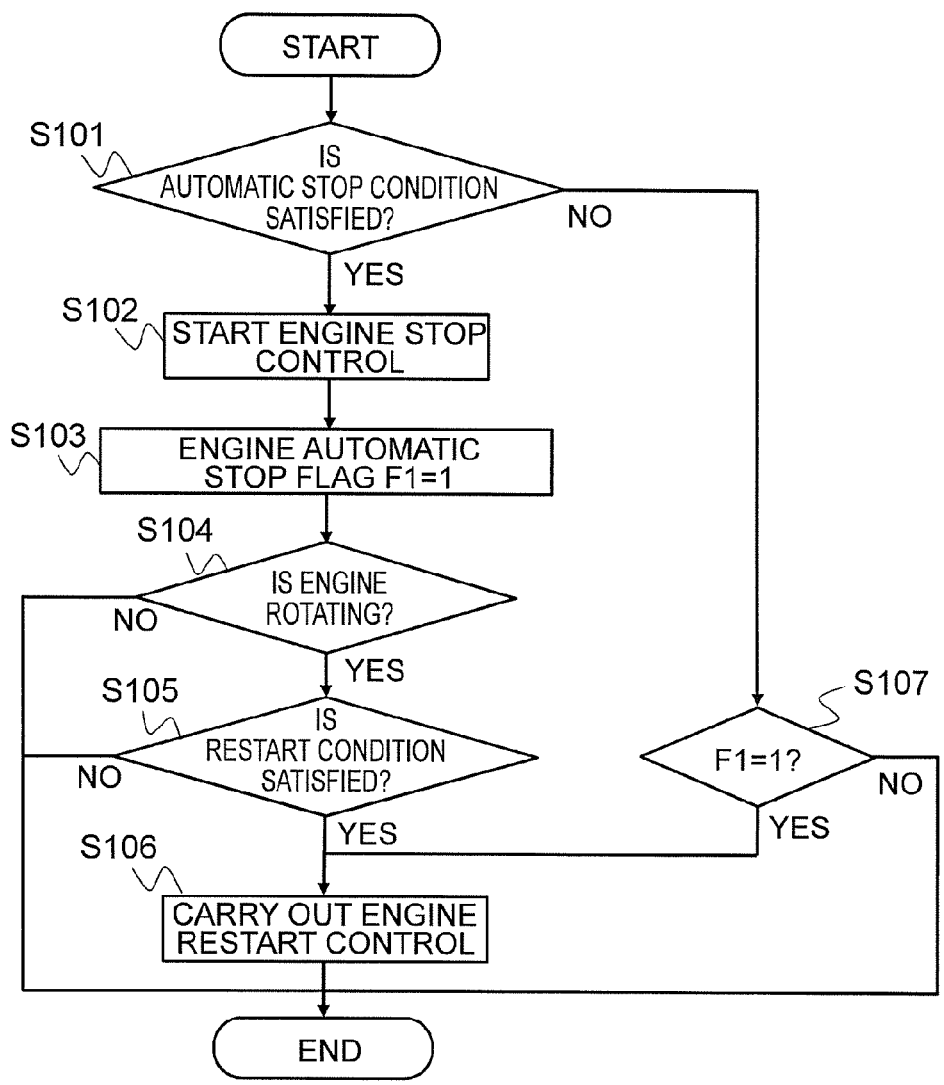
FIG. 3 is a flowchart illustrating a sequence of processing in the engine starting device according to the first embodiment of the present invention.

Referring to FIG. 3, a description is now given of a specific operation of the engine starting device according to the first embodiment of the present invention. FIG. 3 is a flowchart illustrating a sequence of processing in the engine starting device according to the first embodiment of the present invention.

First, the controller 13 determines whether the engine automatic stop condition is satisfied or not (Step S101).

On the one hand, in Step S101, when the controller 13 determines that the engine automatic stop condition is satisfied (in other words, the determination is Yes), the controller 13 starts engine stop control (Step S102). Specifically, the controller 13 stops the fuel injection to the engine, and reduces the engine rotation speed NE by the inertial rotation.

Then, the controller 13 determines that the engine is being automatically stopped, and sets an engine automatic stop flag F1 to "1" (Step S103).

Then, the controller 13 determines whether the engine is inertially rotating or not (Step S104). On this occasion, whether the engine is inertially rotating or not can be determined, for example, based on whether the crank angle pulse is detected in a predetermined time period (such as 300 milliseconds) or not.

In Step S104, when the pulse of the crank angle is not detected in the predetermined time period, and it is thus determined that the engine is not inertially rotating (in other words, the determination is No), the controller 13 determines that the engine is completely stopped, finishes the processing in FIG. 3, and proceeds to the next control cycle.

On the other hand, in Step S104, when the controller 13 determines that the engine is inertially rotating (in other words, the determination is Yes), the controller 13 determines whether an engine restart condition is satisfied or not (Step S105).

In Step S105, when the controller 13 determines that the engine restart condition is satisfied (in other words, the determination is Yes), the controller 13 carries out the engine restart control (Step S106).

On the other hand, in Step S105, when the controller 13 determines that the engine restart condition is not satisfied (in other words, the determination is No), the controller 13 finishes the processing in FIG. 3, and proceeds to the next control cycle.

Further, on the other hand, in Step S101, when the controller 13 determines that the engine automatic stop condition is not satisfied (in other words, the determination is No), the controller 13 determines whether the engine automatic stop flag F1 is "1" or not (Step S107).

In Step S107, when the controller 13 determines that the engine automatic stop flag F1 is "1" (in other words, the determination is Yes), the controller 13 determines that the engine is being automatically stopped, proceeds to Step S106, and carries out (continues) the engine restart control.

On the other hand, in Step S107, when the controller 13 determines that the engine automatic stop flag F1 is "0" (in other words, the determination is No), the controller 13 determines that the engine is not being automatically stopped, finishes the processing of FIG. 3, and proceeds to the next control cycle.

Figure 4:
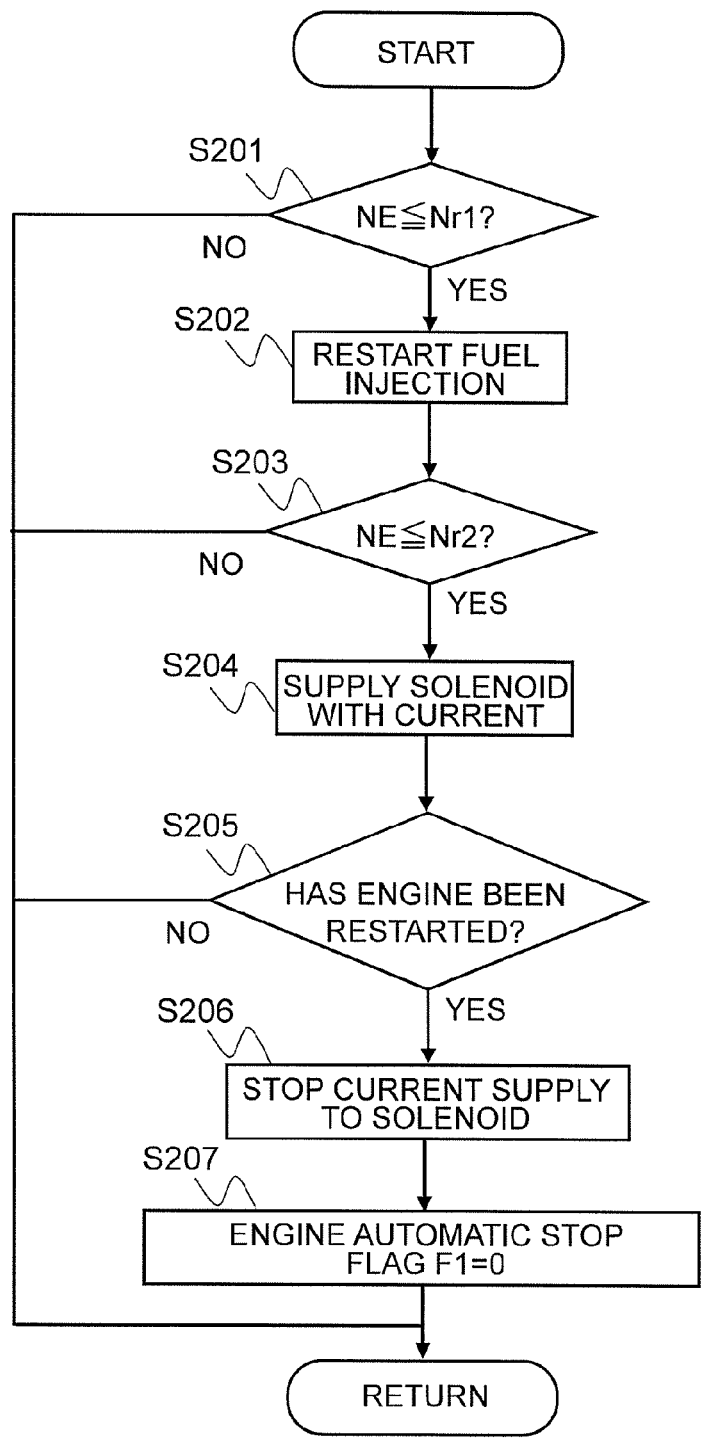
FIG. 4 is a flowchart illustrating a sequence of processing when an engine restart condition is satisfied in the engine starting device according to the first embodiment of the present invention.

Referring to FIG. 4, a detailed description is now given of the engine restart control illustrated in Step S106 of FIG. 3. FIG. 4 is a flowchart illustrating a sequence of processing relating to the starter control and the fuel injection when the engine restart condition is satisfied in the engine starting device according to the first embodiment of the present invention.

First, the controller 13 determines whether the engine rotation speed NE is equal to or less than an after-starter-drive combusting rotation speed Nr1 (such as 400 rpm) or not (Step S201). Note that, after-starter-drive combusting refers to such a state that combustion is generated after the engine rotational speed NE decreases, and the pinion gear 144 and the ring gear 11 are meshed with each other by the controller 13 supplying the solenoid 141 with a current.

Figure 5:
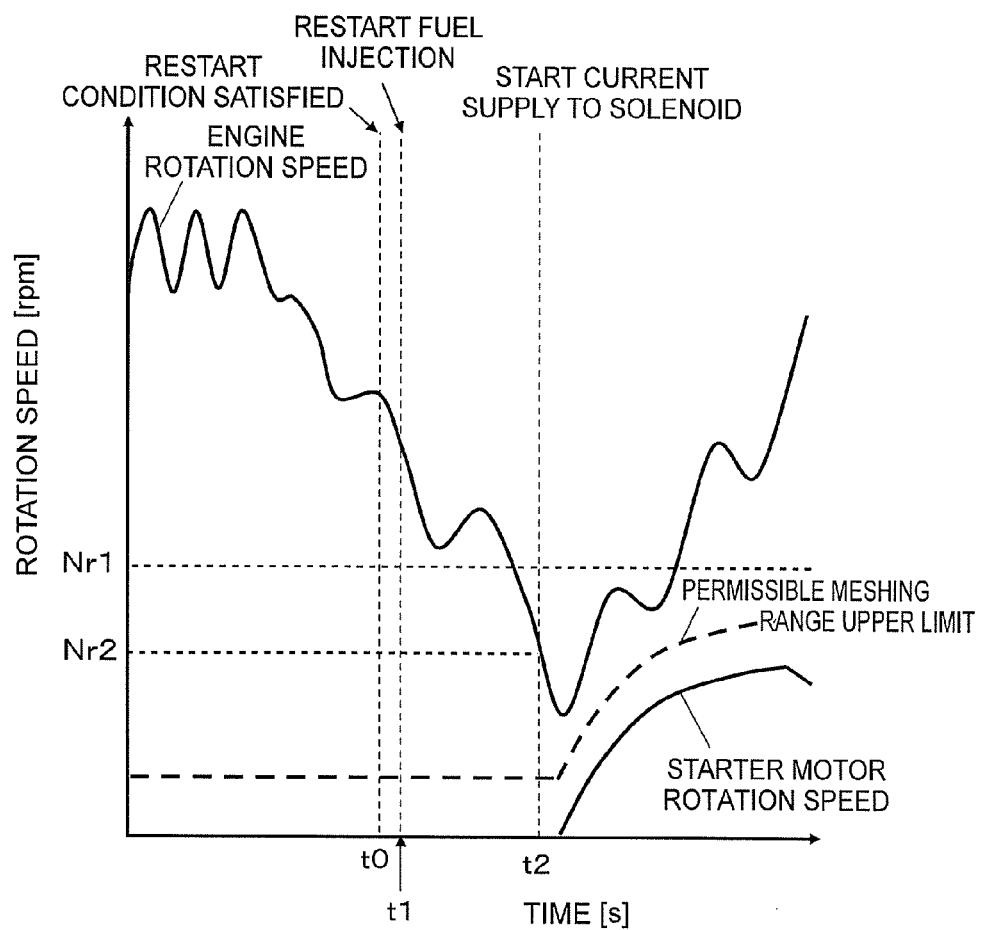
FIG. 5 is a timing chart illustrating an operation when fuel injection is restarted in a state where an engine rotation speed is more than an after-starter-drive combusting rotation speed in the engine starting device according to the first embodiment of the present invention.

On this occasion, referring to FIG. 5, a description is now given of an operation when the fuel injection is restarted in a state where the engine rotation speed NE is more than the after-starter-drive combusting rotation speed Nr1. FIG. 5 is a timing chart illustrating the operation when the fuel injection is restarted in a state where the engine rotation speed is more than the after-starter-drive combusting rotation speed in the engine starting device according to the first embodiment of the present invention.

In FIG. 5, after the engine automatic stop condition is satisfied, and the fuel injection is stopped, the engine restart condition is satisfied at a time point t0. Then, the fuel injection is restarted at a time point t1 before the engine rotation speed NE decreases to the after-starter-drive combusting rotation speed Nr1. Then, the engine rotation speed NE decreases, the current supply to the solenoid 141 starts, and the pinion gear 144 starts moving.

However, after the current supply to the solenoid 141, a time delay is generated until the pinion gear 144 reaches the ring gear 11. Therefore, after the current supply to the solenoid 141 is started to move the pinion gear 144, the combustion may be restarted in the compression stroke of the cylinder to which the fuel is injected before the pinion gear 144 meshes with the ring gear 11, and the meshing may not be completed.

In this case, the pinion gear 144 is bounced back on a gear end surface of the ring gear 11, and noise and a damage on the gear may be generated, which is not preferred. Note that, the completion of the meshing is such a state that a difference between the engine rotation speed NE and the starter motor rotation speed is in a predetermined range (such as 100 rpm) of permitting the meshing, and the pinion gear 144 is moved behind the end surface of the ring gear 11 so that the pinion gear 144 and the ring gear 11 can transmit a torque to/from each other.

Then, the engine starting device according to the first embodiment of the present invention carries out the processing illustrated in FIG. 4 when the engine restart condition is satisfied.

Returning to FIG. 4, in Step S201, when the controller 13 determines that the engine rotation speed NE is more than the after-starter-drive combusting rotation speed Nr1 (in other words, the determination is No), the controller 13 finishes the processing in FIG. 4, and proceeds to the next control cycle.

On the other hand, in Step S201, when the controller 13 determines that the engine rotation speed NE is equal to or less than the after-starter-drive combusting rotation speed Nr1 (in other words, the determination is Yes), the controller 13 restarts the fuel injection (Step S202).

Then, the controller 13 determines whether the engine rotation speed NE is equal to or less than a starter drive permission rotation speed Nr2 (such as 200 rpm) or not (Step S203). Note that, starter drive permission is to start the current supply to the solenoid 141, thereby starting the movement of the pinion gear 144.

In Step S203, when the controller 13 determines that the engine rotation speed NE is more than the starter drive permission rotation speed Nr2 (in other words, the determination is No), the controller 13 finishes the processing in FIG. 4, and proceeds to the next control cycle.

On the other hand, in Step S203, when the controller 13 determines that the engine rotation speed NE is equal to or less than the starter drive permission rotation speed Nr2 (in other words, the determination is Yes), the controller 13 starts the current supply to the solenoid 141 (Step S204).

On this occasion, the movement of the pinion gear 144 is started by the current supply to the solenoid 141, and the pinion gear 144 and the ring gear 11 mesh with each other. Moreover, the movement of the plunger 142 closes the contact, and the current is thus supplied to the starter motor 145, resulting in rotation of the starter motor 145.

Then, the controller 13 determines whether the engine restart has been completed or not (Step S205). On this occasion, whether the engine restart has been completed or not can be determined based on, for example, whether the engine rotation speed NE is equal to or more than a predetermined rotation speed (such as 700 rpm).

In Step S205, when the controller 13 determines that the engine restart has not been completed (in other words, the determination is No), the controller 13 finishes the processing in FIG. 4, and proceeds to the next control cycle.

On the other hand, in Step S205, when the controller 13 determines that the engine restart has been completed (in other words, the determination is Yes), the controller 13 stops the current supply to the solenoid 141 to release the meshing between the pinion gear 144 and the ring gear 11, and stops the power supply to the starter motor 145 (Step S206).

Then, the controller 13 sets the engine automatic stop flag F1 to "0" (Step S207), finishes the processing in FIG. 3, and proceeds to the next control cycle.

Figure 6:
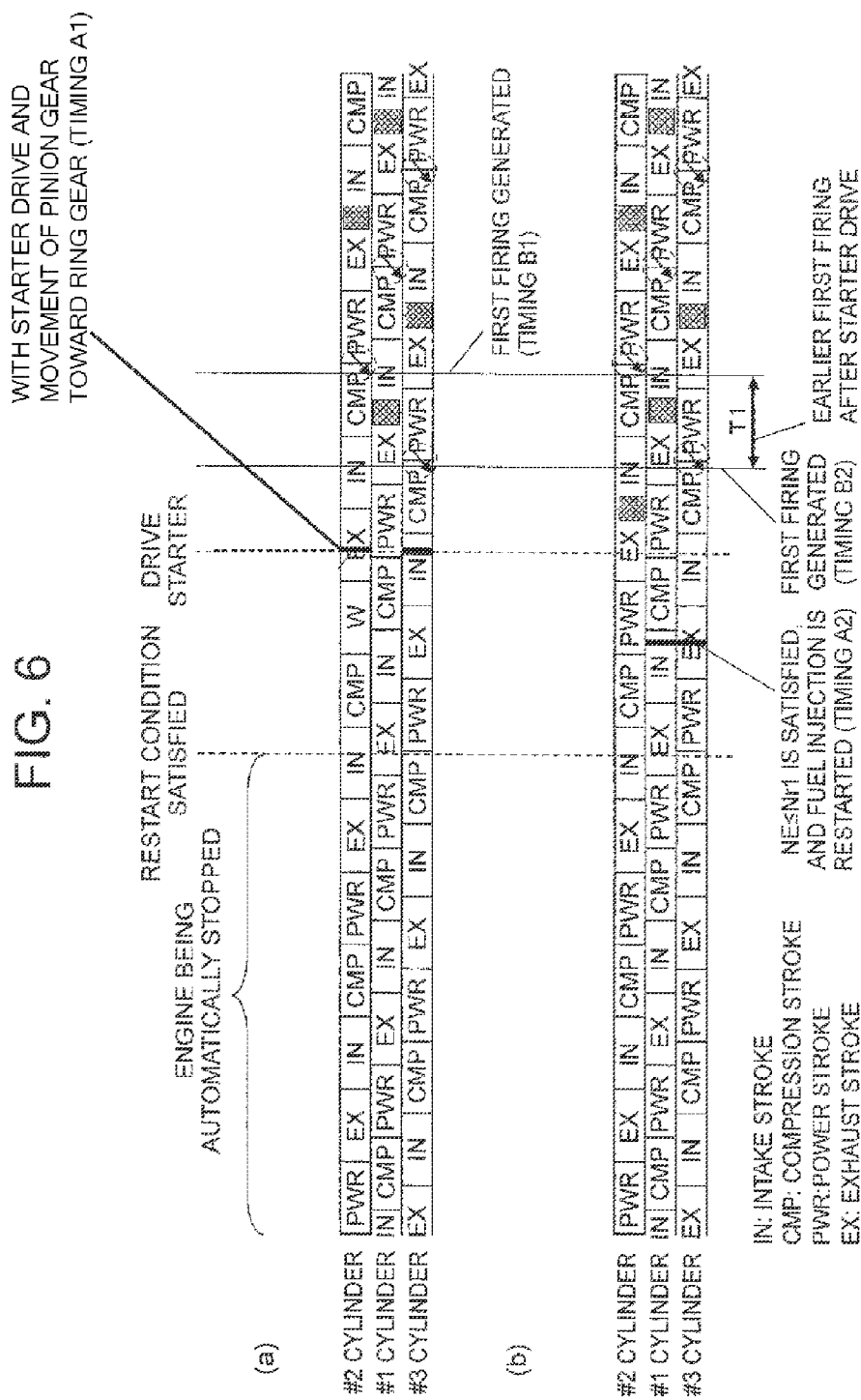
FIGS. 6 (a) and 6(b) are explanatory diagrams illustrating fuel injection control in the engine starting device according to the first embodiment of the present invention in comparison with a related art.

Referring to FIG. 6, a detailed description is now given of the engine restart performed with the fuel injection. FIGS. 6(a) and 6(b) are explanatory diagrams illustrating fuel injection control in the engine starting device according to the first embodiment of the present invention in comparison with the related art. FIG. 6(a) illustrates the restart of fuel injection in response to starter drive according to Patent Literature 1, and FIG. 6 (b) illustrates the restart of the fuel injection in the engine starting device according to the first embodiment of the present invention.

Moreover, FIG. 6 illustrate a case of the three-cylinder engine. Arrows in FIG. 6 represent ignition timings. The ignition is interrupted during the engine automatic stop, and is restarted at a predetermined timing (in this case, at every 5 degrees BTDC of the crank angle in the compression stroke) after the engine restart condition is satisfied. Note that, in FIG. 6, "PWR" represents the power stroke; "EX", the exhaust stroke; "IN", intake stroke; and "CMP", the compression stroke.

First, referring to FIG. 6(a), a description is given of the restart of the fuel injection synchronized with the starter drive. After the engine restart condition is satisfied, when the engine rotation speed decreases to the rotation speed allowing the pinion gear 144 and the ring gear 11 to mesh with each other, the current is supplied to the solenoid 141, thereby starting the drive of the starter 14. Moreover, synchronously with the drive of the starter 14, the fuel is injected into a predetermined plurality of cylinders (for example, cylinders in the intake stroke and the exhaust stroke) (timing A1 in FIG. 6(a)).

Then, the fuel injected at the timing A1 is sucked into the cylinder, and is ignited at a timing B1, resulting in generation of first firing. On this occasion, the fuel is injected into the cylinders in the intake stroke and the exhaust stroke at the timing A1, but the fuel injected into the cylinder (cylinder #3 in FIG. 6(a)) in the intake stroke, which immediately transits to the compression stroke, may not sufficiently enter the cylinder, and may not be combusted by first compression (timing B2) after the fuel injection. Thus, in the compression of the cylinder (cylinder #2 in FIG. 6(a)) into which the fuel is injected in the exhaust stroke at the timing A1, the first combustion is generated (timing B1). Moreover, after the fuel is injected at the timing A1, the engine can be restarted by the normal sequential injection, for example, by carrying out the fuel injection at every 5 degrees BTDC of the crank angle (at timings represented by hatching in FIG. 6(a)) in the exhaust stroke.

Referring to FIG. 6(b), a description is now given of the restart of the fuel injection in the engine starting device according to the first embodiment of the present invention. If it is determined that the engine rotation speed NE is equal to or less than the after-starter-drive combusting rotation speed Nr1 due to the decrease in the engine rotation speed NE after the engine restart condition is satisfied, the fuel injection is carried out toward the predetermined plurality of cylinders (such as the cylinder in the intake stroke and the cylinder in the exhaust stroke) (timing A2 in FIG. 6(b)).

Then, the fuel injected at the timing A2 is sucked into the cylinder, and is ignited at the timing B2, resulting in generation of the first firing. Moreover, after the fuel injection is carried out at the timing A2, the engine can be restarted by the transition to the sequential injection described above.

In this way, the restart of the fuel injection in the engine starting device according to the first embodiment of the present invention can induce the first firing earlier (by the period of T1 illustrated in FIG. 6(b)) than the restart of the engine by the restart of the fuel injection synchronized with the starter drive. As a result, a time period required for restarting the engine is reduced.

Figure 7:
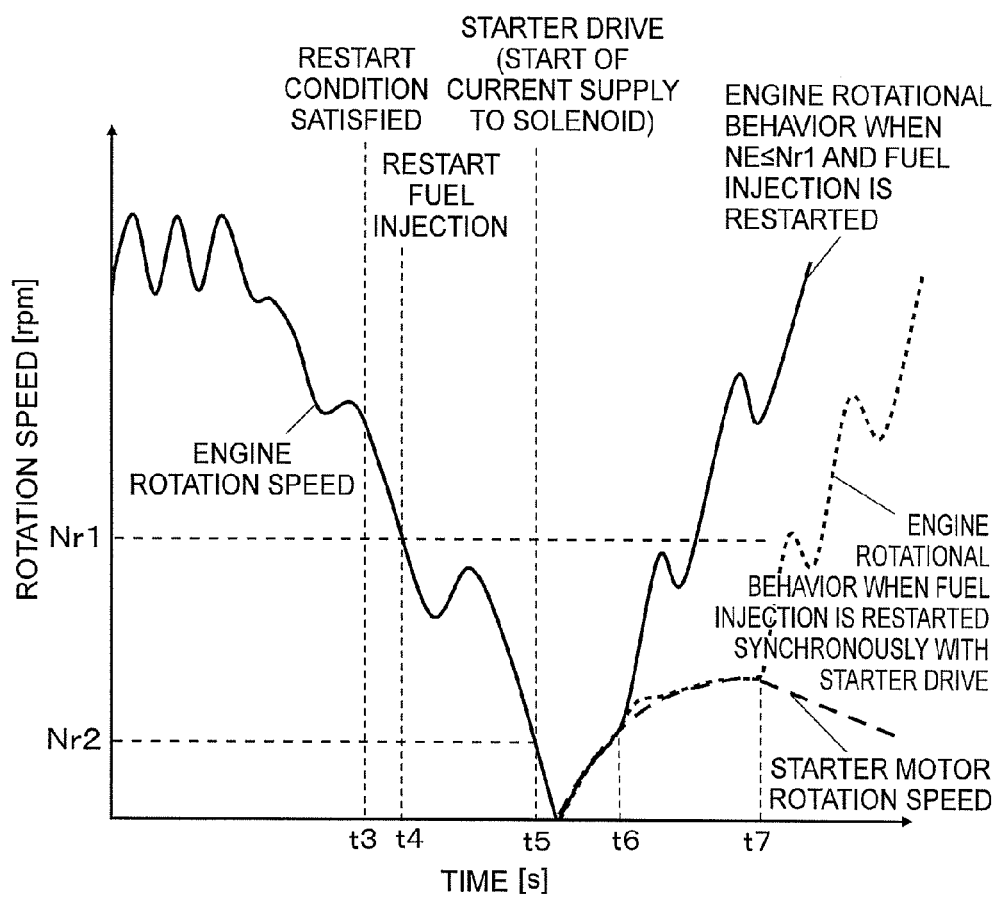
FIG. 7 is a timing chart illustrating an operation of the engine starting device according to the first embodiment of the present invention.

Referring to FIG. 7, a description is now given of an operation of the engine starting device according to the first embodiment of the present invention. FIG. 7 is a timing chart illustrating an operation of the engine starting device according to the first embodiment of the present invention.

In FIG. 7, the engine automatic stop condition is satisfied during the travel of the vehicle, and the fuel injection is stopped. Then, at a time point t3 when the engine restart condition (such a condition that the driver removes the foot from the brake pedal) is satisfied, the engine rotation speed NE is more than the after-starter-drive combusting rotation speed Nr1, and the fuel injection is not restarted (No in Step S201 of FIG. 4).

Then, at a time point t4 when the engine rotation speed NE further decreases to an engine rotation speed equal to or less than the after-starter-drive combusting rotation speed Nr1, the fuel injection is restarted (Yes in Step S201 of FIG. 4). Then, at a time point t5 when the engine rotation speed NE becomes equal to or less than the starter drive permission rotation speed Nr2 after the fuel injection is restarted, the current supply to the solenoid 141 is started to drive the starter motor 145.

Then, the fuel injected at the time point t4 is combusted in the compression stroke, and the first firing is generated at a time point t6. Moreover, in FIG. 7, an engine rotational behavior when the fuel injection synchronous with the starter drive is carried out is represented by a dotted line. The fuel injection is restarted not at the time point t4, but at the time point t5 or later, and hence the fuel is not injected before the compression stroke at the time point t6, resulting in generation of the first firing at a time point t7 at the earliest.

In this way, after the engine restart condition is satisfied during the inertial rotation and then the engine rotation speed NE becomes equal to or less than the after-starter-drive combusting rotation speed Nr1, the controller 13 restarts the fuel injection before the pinion gear 144 starts moving, thereby generating the combustion in the first compression cylinder after the gear meshing.

As a result, the engine can be quickly and quietly restarted so that the driver does not feel a sense of discomfort, and a current supply period of the starter can be reduced to achieve a power saving and extensions of service lives of components.

As described above, according to the first embodiment, the engine starting device for stopping, when the engine automatic stop condition is satisfied, the fuel injection to the engine to automatically stop the engine, and for thereafter restarting the engine when the engine restart condition is satisfied, includes the ring gear coupled to the crankshaft of the engine, the starter motor rotated by the current supply, the pinion gear for transmitting the rotation of the starter motor to the ring gear, a pinion gear moving part for moving the pinion gear toward the ring gear by the current supply, thereby meshing the pinion gear with the ring gear, and a fuel injection control part for restarting the fuel injection so that combustion is generated in the predetermined compression cylinder after the engine restart condition is satisfied and after the pinion gear moving part starts the movement of the pinion gear.

Moreover, the predetermined compression cylinder is the first compression cylinder after the completion of the meshing between the pinion gear and the ring gear.

Therefore, the fuel injection is carried out so that the combustion is generated in the first compression cylinder after the starter motor is driven, thereby earlier restarting the engine.

Moreover, the fuel injection control part restarts the fuel injection after the engine restart condition is satisfied and before the pinion gear moving part starts the movement of the pinion gear.

Moreover, when the engine restart condition is satisfied during the inertial rotation of the engine caused by the stop of the fuel injection to the engine, the current supply to the starter motor is started based on at least an engine rotation speed after the movement of the pinion gear is started by the pinion gear moving part.

Therefore, the fuel injection is carried out so that the combustion is generated at the first ignition timing after the starter motor is driven, thereby earlier restarting the engine.

Second Embodiment

In the description of the first embodiment, the fuel injection is restarted based on the comparison between the engine rotation speed NE and the after-starter-drive combusting rotation speed Nr1, and the combustion is generated in the first compression cylinder after the meshing of the gears.

However, a combustion efficiency is generally low when the engine rotation speed NE is extremely low, and if the ignition is carried out before the top dead center (such as 5 degrees BTDC), a combustion torque is generated in a reverse rotational direction. Therefore, the fuel injection may be restarted so that the combustion is generated in the first compression cylinder after the gears mesh with each other and the rotation speed becomes equal to or more than a combustion permission engine rotation speed (such as 200 rpm).

Thus, in a second embodiment of the present invention, a description is now given of a case where the controller 13 restarts the fuel injection so that the combustion is generated in the first compression cylinder after the engine rotation speed NE becomes equal to or more than a combustion permission engine rotation speed Nr3. Note that, the configuration of an engine starting device according to the second embodiment of the present invention is the same as that of the first embodiment, and a description thereof is therefore omitted.

Figure 8:
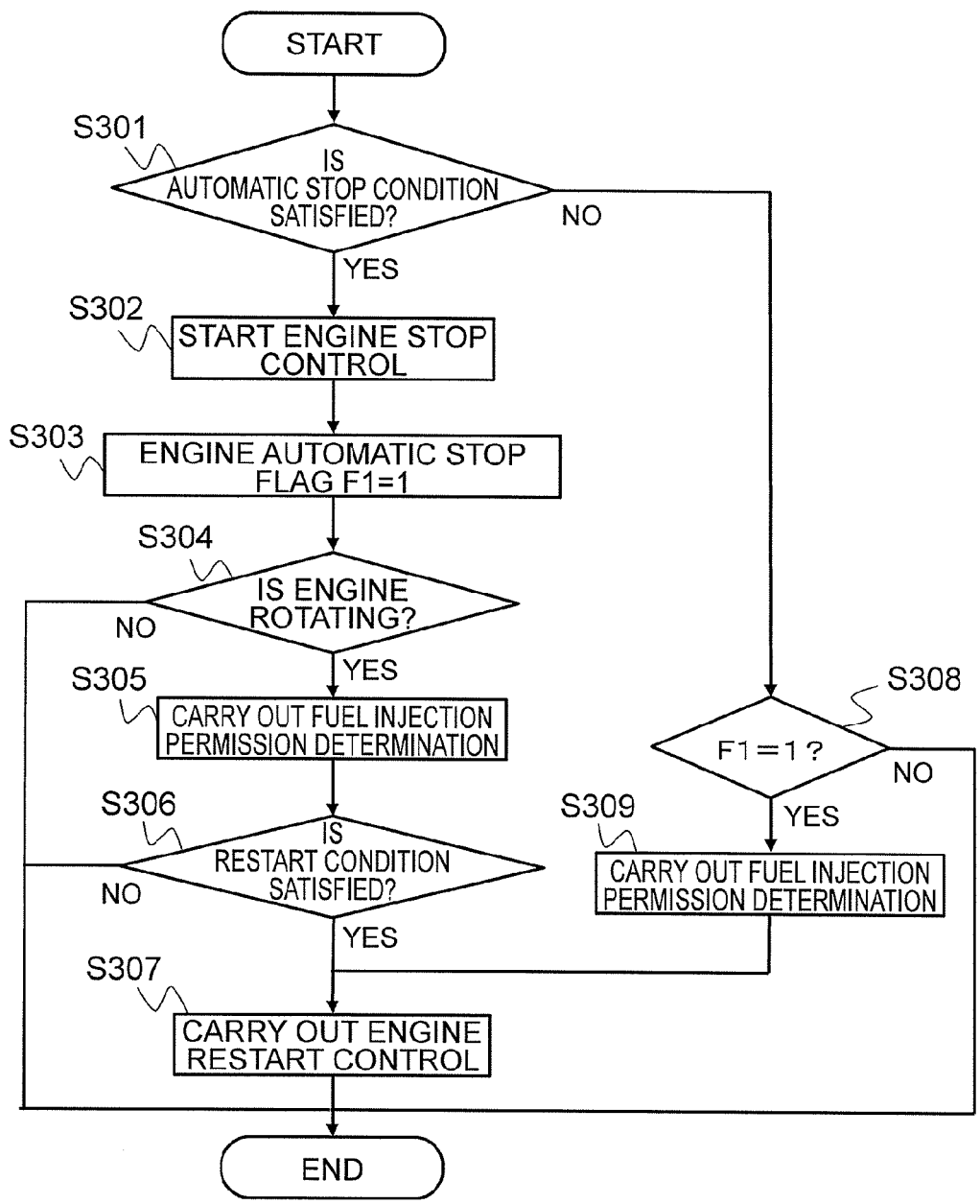
FIG. 8 is a flowchart illustrating a sequence of processing in an engine starting device according to a second embodiment of the present invention.

Referring to FIG. 8, a description is now given of a specific operation of the engine starting device according to the second embodiment of the present invention. FIG. 8 is a flowchart illustrating a sequence of processing in the engine starting device according to the second embodiment of the present invention.

The processing in FIG. 8 is basically the same as Step S101 to Step S107 illustrated in FIG. 3. However, when the controller 13 determines in Step S304 that the engine is inertially rotating (in other words, the determination is Yes), and determines in Step S308 that the engine automatic stop flag F1 is "1" (in other words, the determination is Yes), the controller 13 further carries out fuel injection permission determination (Step S305 or Step S309).

Figure 9:
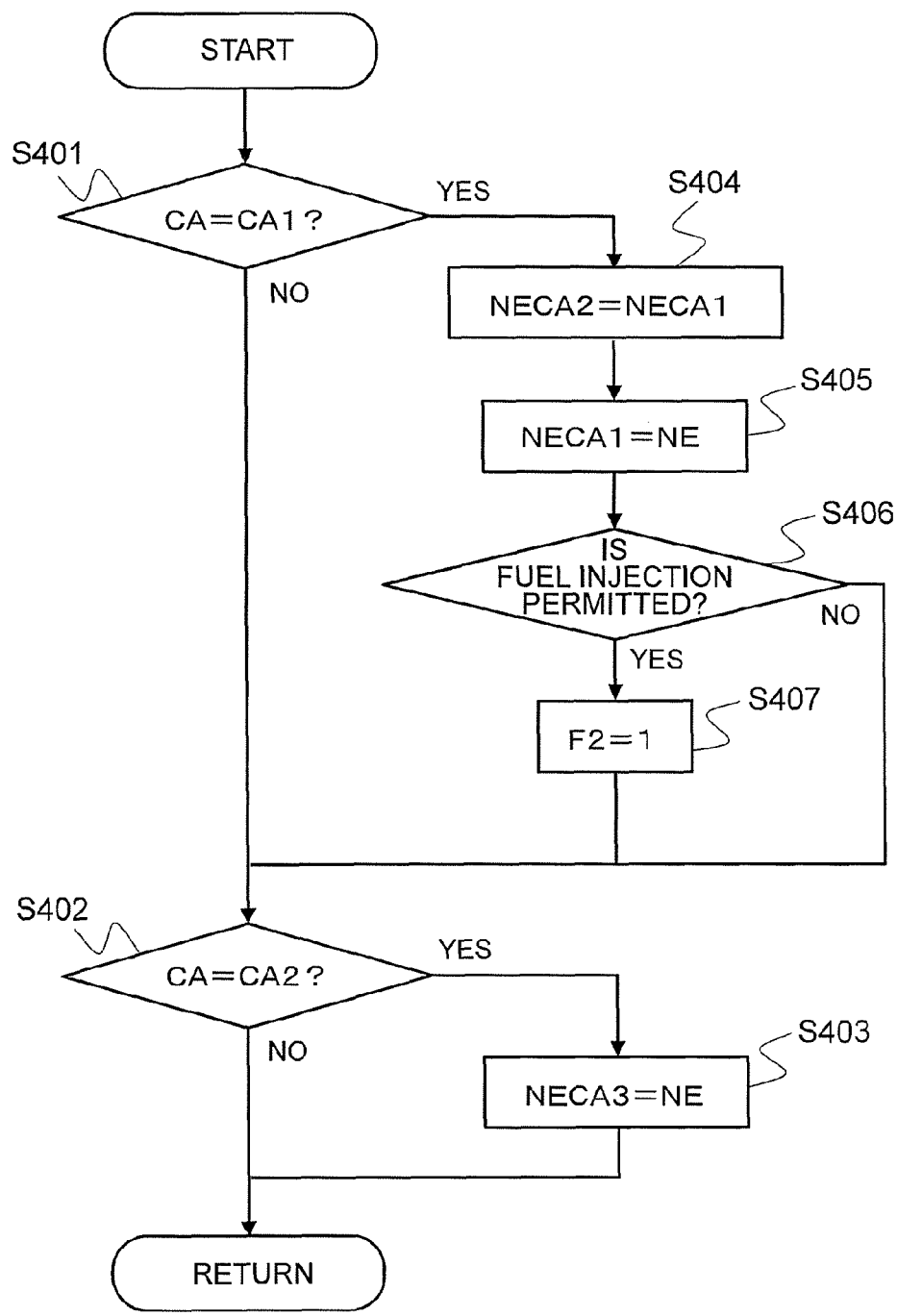
FIG. 9 is a flowchart illustrating a sequence of processing for fuel injection permission determination in the engine starting device according to the second embodiment of the present invention.

Referring to FIG. 9, a detailed description is now given of the fuel injection permission determination illustrated in Step S305 or Step S309 of FIG. 8. FIG. 9 is a flowchart illustrating a sequence of the fuel injection permission determination processing in the engine starting device according to the second embodiment of the present invention.

First, the controller 13 determines whether or not a crank angle CA at a processing timing for this time is an angle CA1, which is an intake limit, (such as 90 degrees BTDC) (Step S401).

In Step S401, when the controller 13 determines that the crank angle CA at the processing timing for this time is not the angle CA1, which is the intake limit, (in other words, the determination is No), the controller 13 determines whether or not the crank angle CA at the processing timing for this time is a predetermined combustibility determination angle CA2 (such as 30 degrees BTDC) (Step S402).

On this occasion, the combustibility determination angle CA2 is an angle before the ignition timing (5 degrees BTDC) in the compression cylinder by a rotational angle required for the engine rotation speed NE to become equal to or more than the combustion permission engine rotation speed Nr3 by the starter motor 145. For example, if the engine rotation speed NE becomes equal to or more than the combustion permission engine rotation speed Nr3 in a period during which the crankshaft is rotated by the starter motor 145 by 25 degrees, the combustibility determination angle CA2 is 30 degrees BTDC, which is 25 degrees before 5 degrees BTDC.

In Step S402, when the controller 13 determines that the crank angle CA at the processing timing for this time is the combustibility determination angle CA2 (in other words, the determination is Yes), the controller 13 stores the engine rotation speed NE at the processing timing for this time in NECA3 (Step S403), thereby storing the engine rotation speed at the combustibility determination angle CA2 in the stroke for this time, and finishes the processing for the fuel injection permission determination at the processing timing for this time illustrated in FIG. 9.

On the other hand, in Step S402, when the controller 13 determines that the crank angle CA at the processing timing for this time is not the combustibility determination angle CA2 (in other words, the determination is No), the controller 13 directly finishes the processing for the fuel injection permission determination at the processing timing for this time illustrated in FIG. 9.

On the other hand, in Step S401, when the controller 13 determines that the crank angle CA at the processing timing for this time is the angle CA1, which is the intake limit (in other words, the determination is Yes), the controller 13 stores NECA1 in NECA2 (Step S404), thereby storing the engine rotation speed at the angle CA1, which is the intake limit in the previous stroke.

Then, the controller 13 stores the engine rotation speed NE at the processing timing for this time in the NECA1 (Step S405), thereby storing the engine rotation speed at the angle CA1, which is the intake limit in this stroke.

Then, the controller 13 determines whether or not an engine rotation speed NEb at a combustion timing in a first compression cylinder after the gear meshing is equal to or more than the combustion permission engine rotation speed Nr3, in other words, determines whether to permit the fuel injection or not (Step S406).

In Step S406, when the controller 13 determines that the engine rotation speed NEb is equal to or more than the combustion permission engine rotation speed Nr3 (in other words, the determination is Yes), the controller 13 sets the fuel injection permission flag F2 to "1" (Step S407), and proceeds to Step S402.

On the other hand, in Step S406, when the controller 13 determines that the engine rotation speed NEb is less than the combustion permission engine rotation speed Nr3 (in other words, the determination is No), the controller 13 directly proceeds to Step S402.

On this occasion, in Step S406, specifically, the controller 13 makes the determination based on Equation (1).

$$2\left(NECA1\frac{2\pi}{60}\right)^2 + \left(NECA3\frac{2\pi}{60}\right)^2 - 2\left(NECA2\frac{2\pi}{60}\right)^2 < 0$$

A viscous resistance depending on the rotation speed can be considered to be approximately zero at a rotation speed equal to or less than an idle rotation speed (such as 700 rpm) during the inertial rotation of the engine, and energy losses at respective angles are considered to be equal to each other.

In other words, a rotational energy change ELoss1 for one stroke at the rotational angle CA1, which is the intake limit, can be represented as Equation (2) where J is the rotational inertia of the engine.

$$ELoss1 = \frac{1}{2}J\left(NECA2\frac{2\pi}{60}\right)^2 - \frac{1}{2}J\left(NECA1\frac{2\pi}{60}\right)^2$$

Similarly, a rotational energy change ELoss2 between the angle CA1, which is the intake limit, and the combustibility determination angle CA2 can be represented by the engine rotation speed of the previous stroke as Equation (3).

$$ELoss2 = \frac{1}{2}J\left(NECA2\frac{2\pi}{60}\right)^2 - \frac{1}{2}J\left(NECA3\frac{2\pi}{60}\right)^2$$

Moreover, referring to Equations (2) and (3), rotational energy at the combustibility determination angle CA2 in the next stroke is represented as Equation (4) at the angle CA1, which is the intake limit.

$$\frac{1}{2}J\left(NECA1\frac{2\pi}{60}\right)^2 - ELoss1 - ELoss2$$

Note that, the left side of Equation (1) is acquired by dividing Equation (4) by J and multiplying the resultant by 2. A state where the left side of Equation (1) is less than 0, in other words, the rotational energy at the combustibility determination angle CA2 in the next stroke is less than 0 means that the engine does not rotate to the angle only by the inertial rotation thereof, and the engine reaches the angle during the rotation by the starter motor 145 after the pinion gear 144 and the ring gear 11 mesh with each other.

On this occasion, regarding the combustibility determination angle CA2, the combustion timing of the compression cylinder is reached after the engine rotation speed NE becomes equal to or more than the combustion permission engine rotation speed Nr3 during the rotation by the starter motor 145, and hence the combustion can be efficiently carried out to restart the engine smoothly.

Moreover, in contrast, if the left side of Equation (1) is equal to or more than 0, in other words, the rotational energy at the combustibility determination angle CA2 in the next stroke is equal to or more than 0, one stroke or more exist until the gears mesh with each other, or the engine rotation speed NE becomes 0 after the arrival at the combustibility determination angle CA2 and before the combustion timing.

Thus, if the fuel injection is restarted when the rotational energy at the combustibility determination angle CA2 in the next stroke is equal to or more than 0, the combustion is restarted before the gear meshing, or the rotation by the starter motor 145 is not sufficiently carried out (less than 25 degrees). Thus, the combustion timing of the compression cylinder is reached in a state where the engine rotation speed NE is low, and the engine may not be smoothly restarted. Therefore, the engine can be smoothly restarted by setting the fuel injection permission flag F2 based on whether Equation (1) is true or false.

Figure 10:
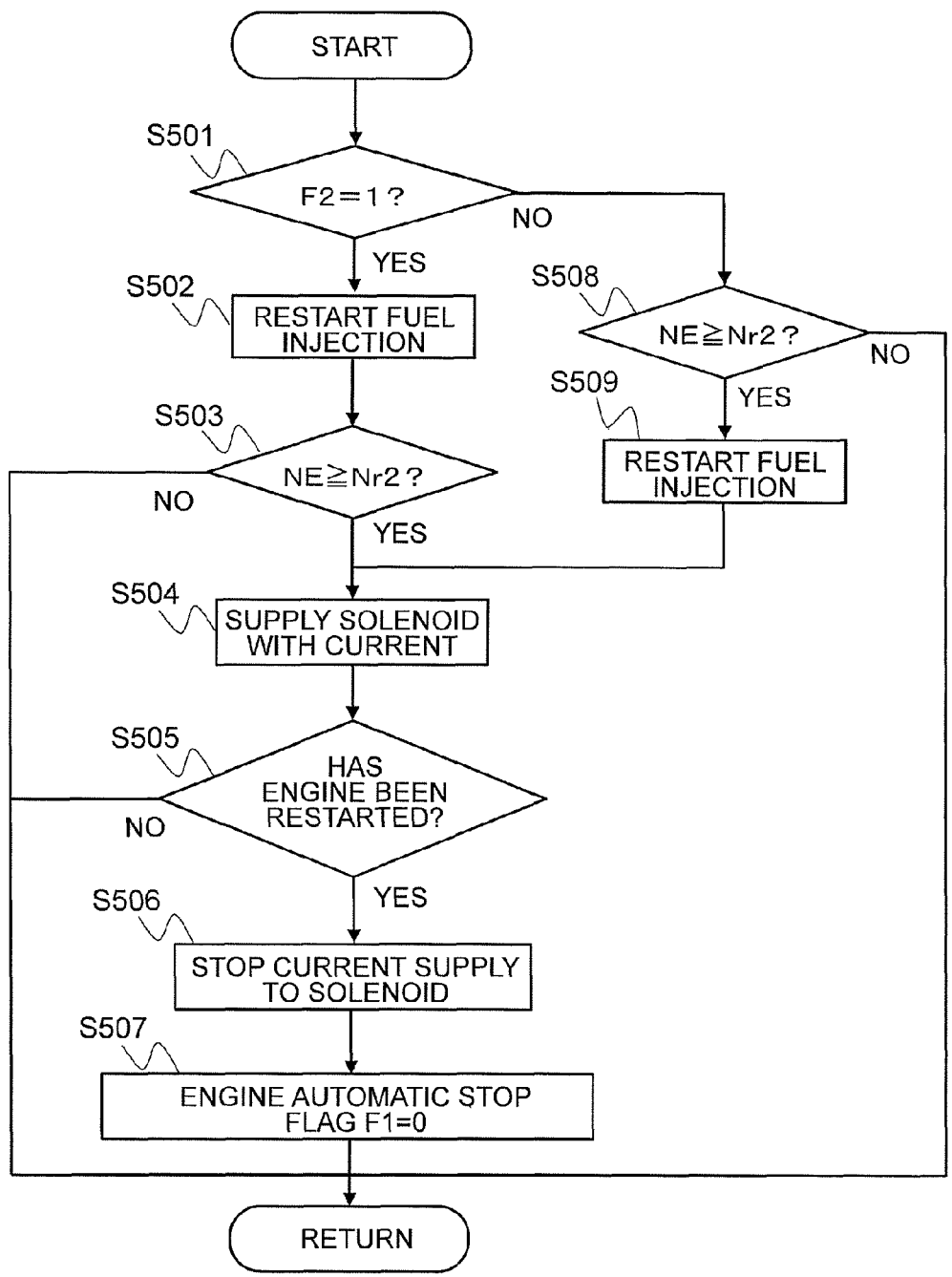
FIG. 10 is a flowchart illustrating a sequence of processing when the engine restart condition is satisfied in the engine starting device according to the second embodiment of the present invention.

Referring to FIG. 10, a detailed description is now given of the engine restart control illustrated in Step S307 of FIG. 8. FIG. 10 is a flowchart illustrating a sequence of processing relating to the starter control and the fuel injection when the engine restart condition is satisfied in the engine starting device according to the second embodiment of the present invention.

First, the controller 13 determines whether the fuel injection permission flag F2 is "1" or not (Step S501).

In Step S501, when the controller 13 determines that the fuel injection permission flag F2 is "1" (in other words, the determination is Yes), the controller 13 proceeds to Step S502, and restarts the fuel injection. Processing starting from Step S502 is the same as the processing in Step S202 to Step S207 illustrated in FIG. 4, and a description thereof is therefore omitted.

On the other hand, in Step S501, when the controller 13 determines that the fuel injection permission flag F2 is "0"

(in other words, the determination is No), the controller 13 determines whether the engine rotation speed NE at the processing timing for this time is equal to or more than the starter drive permission rotation speed Nr2 or not (Step S508).

In Step S508, when the controller 13 determines that the controller 13 determines that the engine rotation speed NE at the processing timing for this time is equal to or more than the starter drive permission rotation speed Nr2 (in other words, the determination is Yes), the controller 13 restarts the fuel injection (Step S509), proceeds to Step S504, and starts the current supply to the solenoid 141.

On the other hand, in Step S508, when the controller 13 determines that the engine rotation speed NE at the processing timing for this time is less than the starter drive permission rotation speed Nr2 (in other words, the determination is No), the controller 13 finishes the processing for the engine restart control at the processing timing for this time illustrated in FIG. 10, and proceeds to the next control cycle.

In this way, the controller 13 determines whether the engine rotation speed NEb at the combustion timing in the compression cylinder is equal to or more than the combustion permission engine rotation speed Nr3 or not based on whether the rotational energy of the engine at the combustibility determination angle CA2 is less than 0 or not. Moreover, the controller 13 restarts the fuel injection before the movement of the pinion gear 144 based on the determination, thereby generating the combustion in the first compression cylinder when the rotation speed is equal to or more than the combustion permission engine rotation speed Nr3.

As a result, the engine can be quickly and quietly restarted so that the driver does not feel a sense of discomfort, and a current supply period of the starter can be reduced to achieve a power saving and extensions of service lives of components.

Moreover, the fuel injection permission determination is made at the timing of the angle CA1, which is the intake limit, and hence even if the engine restart condition is satisfied at a later timing, the fuel injection can be restarted early.

As described above, according to the second embodiment, the engine starting device for stopping, when the engine automatic stop condition is satisfied, the fuel injection to the engine to automatically stop the engine, and for thereafter restarting the engine when the engine restart condition is satisfied, includes the ring gear coupled to the crankshaft of the engine, the starter motor rotated by the current supply, the pinion gear for transmitting the rotation of the starter motor to the ring gear, a pinion gear moving part for moving the pinion gear toward the ring gear by the current supply, thereby meshing the pinion gear with the ring gear, and a fuel injection control part for restarting the fuel injection so that combustion is generated in the predetermined compression cylinder after the engine restart condition is satisfied and after the pinion gear moving part starts the movement of the pinion gear.

Moreover, the engine starting device further includes a rotation speed estimation part for estimating the engine rotation speed at the predetermined compression cylinder, and the predetermined compression cylinder is a first compression cylinder when the engine rotation speed estimated by the rotation speed estimation part becomes equal to or more than the predetermined rotation speed.

Therefore, the fuel injection is carried out so that the combustion is generated in the first compression cylinder after the starter motor is driven, thereby earlier restarting the engine.

Moreover, the rotation speed estimation part estimates the engine rotation speed before the intake limit at each of the cylinders of the engine.

Therefore, the fuel injection is carried out so that the combustion is generated at the first ignition timing after the starter motor is driven, thereby earlier restarting the engine.

Third Embodiment

In the description of the second embodiment, the combustion timing is 5 degrees BTDC, but the voltage charge to the ignition coil 16 may be started after the top dead center (such as 5 degrees ATDC) to carry out the ignition.

If the ignition is carried out after the top dead center in this way, even when the combustion is generated at the low rotation speed, the combustion torque in the reverse rotational direction is not generated, and hence an area where the fuel injection can be restarted can be extended. Specifically, the combustibility determination angle CA2 can be set to an angle closer to the top dead center.

Moreover, if the voltage charge to the ignition coil 16 is started before the top dead center, and the meshing between the pinion gear 144 and the ring gear 11 fails for some reason, the voltage charge needs to be released to generate an ignition spark in order to prevent the ignition coil 16 from being burnt.

On this occasion, if the fuel injection has been restarted, the combustion is generated by the ignition before the top dead center, and vibration of the engine or the like may make the driver feel a sense of discomfort. Therefore, if the voltage charge to the ignition coil 16 is started after the top dead center, even when the meshing between the pinion gear 144 and the ring gear 11 fails, and the voltage charge is released, the torque in the reverse rotational direction is not generated, and the vibration of the engine or the like can be restrained.

As described above, the engine starting device according to the third embodiment further includes an ignition coil and an ignition timing control part for controlling the ignition timing by the ignition coil, and the ignition timing control part sets the ignition in the predetermined compression cylinder after the top dead center.

The engine starting device further includes the ignition coil, and an ignition preparation part for charging the ignition coil with a voltage, and the ignition preparation part starts the voltage charge to the ignition coil after the top dead center.

Therefore, the fuel injection is carried out so that the combustion is generated at the first ignition timing after the starter motor is driven, thereby earlier restarting the engine.

REFERENCE SIGNS LIST

10 engine starting device, 11 ring gear, 12 crank angle sensor, 13 controller (pinion gear moving part, fuel injection control part, rotation speed estimation part, ignition timing control part, ignition preparation part), 14 starter, 15 injector, 16 ignition coil, 141 solenoid, 142 plunger, 143 lever, 144 pinion gear, 145 starter motor, 146 one-way clutch

The invention claimed is:
1. An engine starting device for stopping, when an engine automatic stop condition is satisfied, fuel injection to an engine to automatically stop the engine, and for thereafter restarting the engine when an engine restart condition is satisfied, the engine starting device comprising:
a ring gear coupled to a crankshaft of the engine;
a starter motor rotated by a current supply;
a pinion gear for transmitting the rotation of the starter motor to the ring gear;
a pinion gear moving part for moving the pinion gear toward the ring gear by another current supply, thereby meshing the pinion gear with the ring gear; and
a fuel injection controller restarting the fuel injection at the same time the pinion gear moving part starts the movement of the pinion gear toward the ring gear so that combustion is generated in a predetermined compression cylinder after the engine restart condition is satisfied and after the pinion gear moving part starts the movement of the pinion gear.

2. An engine starting device according to claim 1, wherein the predetermined compression cylinder is a first compression cylinder after completion of the meshing between the pinion gear and the ring gear.

3. An engine starting device according to claim 1, further comprising a rotation speed estimation part for estimating an engine rotation speed at the predetermined compression cylinder
wherein the predetermined compression cylinder is a first compression cylinder after the engine rotation speed estimated by the rotation speed estimation part becomes equal to or more than a predetermined rotation speed.

4. An engine starting device according to claim 3, wherein the rotation speed estimation part estimates the engine rotation speed before 90 degrees before top dead center at each cylinder of the engine.

5. An engine starting device according to claim 1, wherein the fuel injection controller restarts the fuel injection after the engine restart condition is satisfied and before the pinion gear moving part starts the movement of the pinion gear.

6. An engine starting device according to claim 2, wherein the fuel injection controller restarts the fuel injection after the engine restart condition is satisfied and before the pinion gear moving part starts the movement of the pinion gear.

7. An engine starting device according to claim 3, wherein the fuel injection controller restarts the fuel injection after the engine restart condition is satisfied and before the pinion gear moving part starts the movement of the pinion gear.

8. An engine starting device according to claim 4, wherein the fuel injection controller restarts the fuel injection after the engine restart condition is satisfied and before the pinion gear moving part starts the movement of the pinion gear.

9. An engine starting device according to claim 1, further comprising:
an ignition coil; and
an ignition timing control part for controlling an ignition timing of the ignition coil,
wherein the ignition timing control part sets ignition of the predetermined compression cylinder after a top dead center.

10. An engine starting device according to claim 2, further comprising:
an ignition coil; and
an ignition timing control part for controlling an ignition timing of the ignition coil,
wherein the ignition timing control part sets ignition of the predetermined compression cylinder after a top dead center.

11. An engine starting device according to claim 3, further comprising:
an ignition coil; and
an ignition timing control part for controlling an ignition timing of the ignition coil,
wherein the ignition timing control part sets ignition of the predetermined compression cylinder after a top dead center.

12. An engine starting device according to claim 4, further comprising:
an ignition coil; and
an ignition timing control part for controlling an ignition timing of the ignition coil,
wherein the ignition timing control part sets ignition of the predetermined compression cylinder after a top dead center.

13. An engine starting device according to claim 1, further comprising:
an ignition coil; and
an ignition preparation part for charging the ignition coil with a voltage,
wherein the ignition preparation part starts the voltage charge to the ignition coil after a top dead center.

14. An engine starting device according to claim 2, further comprising:
an ignition coil; and
an ignition preparation part for charging the ignition coil with a voltage,
wherein the ignition preparation part starts the voltage charge to the ignition coil after a top dead center.

15. An engine starting device according to claim 3, further comprising:
an ignition coil; and
an ignition preparation part for charging the ignition coil with a voltage,
wherein the ignition preparation part starts the voltage charge to the ignition coil after a top dead center.

16. An engine starting device according to claim 4, further comprising:
an ignition coil; and
an ignition preparation part for charging the ignition coil with a voltage,
wherein the ignition preparation part starts the voltage charge to the ignition coil after a top dead center.

17. An engine starting device according to claim 1, wherein when the engine restart condition is satisfied during an inertial rotation of the engine caused by the stop of the fuel injection to the engine, the current supply to the starter motor is started based on at least an engine rotation speed after the movement of the pinion gear is started by the pinion gear moving part.

18. An engine starting device according to claim 2, wherein when the engine restart condition is satisfied during an inertial rotation of the engine caused by the stop of the fuel injection to the engine, the current supply to the starter motor is started based on at least an engine rotation speed after the movement of the pinion gear is started by the pinion gear moving part.

19. An engine starting device according to claim 3, wherein when the engine restart condition is satisfied during an inertial rotation of the engine caused by the stop of the fuel injection to the engine, the current supply to the starter motor is started based on at least an engine rotation speed after the movement of the pinion gear is started by the pinion gear moving part.

20. An engine starting device according to claim 4, wherein when the engine restart condition is satisfied during an inertial rotation of the engine caused by the stop of the fuel injection to the engine, the current supply to the starter motor is started based on at least an engine rotation speed after the movement of the pinion gear is started by the pinion gear moving part.

21. An engine starting method carried out by an engine starting device for stopping, when an engine automatic stop condition is satisfied, fuel injection to an engine to automatically stop the engine, and for thereafter restarting the engine when an engine restart condition is satisfied, the engine starting device comprising:

a ring gear coupled to a crankshaft of the engine;

a starter motor rotated by a current supply;

a pinion gear for transmitting the rotation of the starter motor to the ring gear; and a pinion gear moving part for moving the pinion gear toward the ring gear by a current supply, thereby meshing the pinion gear with the ring gear, the engine starting method comprising a fuel injection control step of restarting the fuel injection at the same time the pinion gear moving part starts the movement of the pinion gear toward the ring gear so that combustion is generated in a predetermined compression cylinder after the engine restart condition is satisfied and after the pinion gear moving part starts the movement of the pinion gear.

* * * * *